(12) United States Patent  (10) Patent No.: US 8,474,735 B2
Hobbs, Jr. et al.  (45) Date of Patent: Jul. 2, 2013

(54) BROADCAST SPREADER

(75) Inventors: Kenneth Patrick Hobbs, Jr., Louisville, KY (US); Steven H. Taylor, Crestwood, KY (US)

(73) Assignee: Brinly-Hardy Company, Jeffersonville, IN (US)

( * ) Notice: Subject to any disclaimer, the term of this patent is extended or adjusted under 35 U.S.C. 154(b) by 798 days.

(21) Appl. No.: 12/701,378

(22) Filed: Feb. 5, 2010

(65) Prior Publication Data

US 2010/0200680 A1 Aug. 12, 2010

Related U.S. Application Data

(60) Provisional application No. 61/150,367, filed on Feb. 6, 2009.

(51) Int. Cl.
| *A01C 3/06* | (2006.01) |
| *A01C 19/00* | (2006.01) |
| *A01C 17/00* | (2006.01) |

(52) U.S. Cl.
USPC .......... 239/683; 239/650; 239/666; 239/681; 239/684; 239/685; 239/687

(58) Field of Classification Search
USPC ................ 239/505, 650, 665, 666, 681, 683, 239/684, 685, 687
See application file for complete search history.

(56) References Cited

U.S. PATENT DOCUMENTS

| 783,387 A | 2/1905 | Roby et al. |
| 1,919,619 A | 7/1933 | Dean |
| 3,383,055 A | 5/1968 | Speicher |
| 3,575,306 A | 4/1971 | Obermeyer et al. |
| 3,682,395 A | 8/1972 | van der Lely et al. |
| 3,738,546 A | 6/1973 | Speicher |
| 3,817,408 A | 6/1974 | Hanson |
| 3,819,120 A * | 6/1974 | Walker .......................... 239/661 |
| 4,106,703 A | 8/1978 | Magda |
| 4,166,581 A * | 9/1979 | Hetrick .......................... 239/683 |
| 4,401,266 A | 8/1983 | Funkhouser |
| 4,469,210 A | 9/1984 | Blumer et al. |
| 4,548,362 A | 10/1985 | Doering |
| 4,588,133 A | 5/1986 | Brabb et al. |
| 4,681,265 A | 7/1987 | Brabb et al. |
| 4,867,381 A | 9/1989 | Speicher |
| 4,917,343 A | 4/1990 | Wainscott |
| 4,991,781 A | 2/1991 | Barbieri |

(Continued)

FOREIGN PATENT DOCUMENTS

WO 02087310 11/2002

OTHER PUBLICATIONS

Meyer Products LLC, Blaster product information, downloaded at http://www.meyerproducts.com/blaster.asp on Jan. 26, 2009.

(Continued)

*Primary Examiner* — Ryan Reis

(74) *Attorney, Agent, or Firm* — Stites & Harbison, PLLC; David W. Nagle, Jr.

(57) ABSTRACT

A broadcast spreader provides for effective control of the flow of granular material to a rotating fan through use of a gate assembly in combination with an auger assembly. The broadcast spreader further includes a means for directing the granular material onto the fan, thus allowing for the shifting of the distribution pattern of the granular material from side to side.

12 Claims, 16 Drawing Sheets

U.S. PATENT DOCUMENTS

| | | | |
|---|---|---|---|
| 5,145,116 A | 9/1992 | Shaver | |
| 5,294,060 A * | 3/1994 | Thompson | 239/656 |
| 5,340,033 A | 8/1994 | Whitell | |
| 5,370,321 A | 12/1994 | Bianco | |
| 5,501,405 A * | 3/1996 | Doornek | 239/683 |
| 6,047,909 A | 4/2000 | Simpson | |
| 6,089,478 A * | 7/2000 | Truan et al. | 239/675 |
| 6,209,808 B1 | 4/2001 | Anderson | |
| 6,422,490 B1 * | 7/2002 | Truan et al. | 239/659 |
| 6,499,679 B1 | 12/2002 | Woodruff et al. | |
| 6,616,074 B2 | 9/2003 | Courtney et al. | |
| 6,715,703 B2 * | 4/2004 | Kost et al. | 239/687 |
| 7,063,280 B1 | 6/2006 | Bogart et al. | |
| 2002/0014545 A1 | 2/2002 | Woodruff et al. | |
| 2002/0162907 A1 | 11/2002 | Courtney et al. | |
| 2003/0168536 A1 | 9/2003 | Kost et al. | |
| 2003/0192968 A1 * | 10/2003 | Courtney et al. | 239/687 |
| 2007/0194155 A1 | 8/2007 | Kendall | |
| 2008/0078850 A1 | 4/2008 | Bowsher | |

OTHER PUBLICATIONS

ISA/US, International Search Report and Written Opinion for related international patent application No. PCT/US2010/023365, completed Mar. 28, 2010.

* cited by examiner

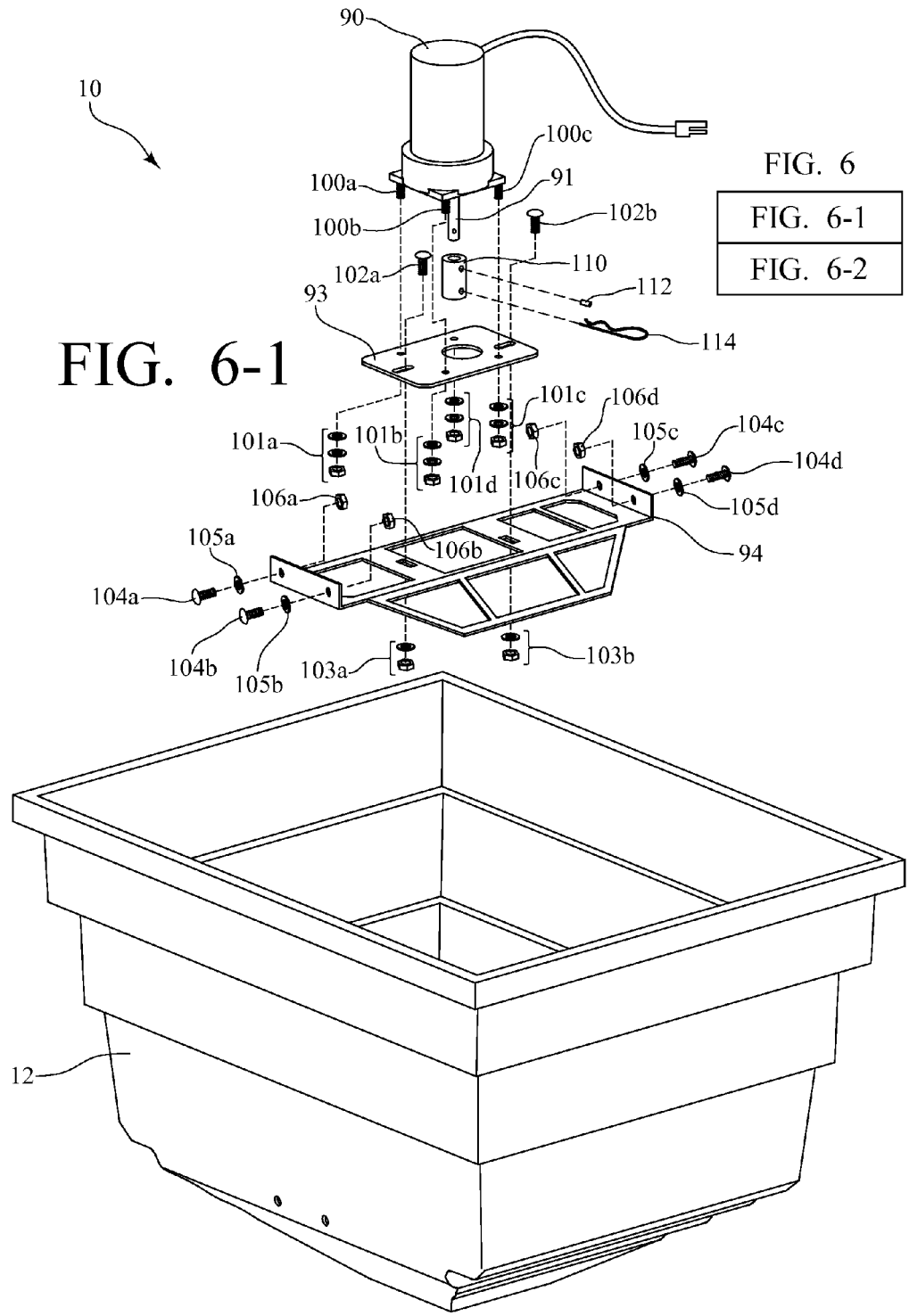

BROADCAST SPREADER

CROSS-REFERENCE TO RELATED APPLICATIONS

The present application claims priority to U.S. Provisional Patent Application Ser. No. 61/150,367 filed on Feb. 6, 2009, the entire disclosure of which is incorporated herein by reference.

TECHNICAL FIELD

The present invention is a broadcast spreader, and, more particularly, a broadcast spreader that not only provides for effective control of the flow of granular material to a rotating fan through use of a gate assembly in combination with an auger assembly, but also allows for the shifting of the distribution pattern of the granular material from side to side.

BACKGROUND OF THE INVENTION

A broadcast spreader (which may also be referred to as a rotary spreader or a spin spreader) is commonly used to distribute granular materials, such as seed, fertilizers, pelletized lime, insecticides, salts, ice melts, and/or mulch to a lawn, field, pasture, paved surface, or other outdoor surface. A broadcast spreader is generally comprised of a hopper that holds the granular material. The hopper may be mounted on a frame with wheels and provided with a handle so that it can be manually pushed. More commonly, the hopper may be mounted or otherwise connected to a tractor, truck, riding mower, all-terrain vehicle (ATV), zero-turn radius mower (ZTR), or other vehicle. In this regard, the hopper may be supported on a frame with wheels and towed behind a vehicle, or it may be mounted directly to the vehicle. However, whether pushed, towed behind a vehicle, or mounted to a vehicle, the broadcast spreader distributes granular material to a lawn, field, pasture, paved surface, or other outdoor surface.

Typically, the hopper has a discharge port (or opening) in a lower portion thereof, with the granular material passing through this discharge port under the force of gravity. The material is then distributed onto a rotating fan which propels the material onto lawn, field, pasture, paved surface, or other outdoor surface. The flow of material, i.e., the amount distributed onto the rotating fan, is commonly controlled by a shutter (or gate). The gate can be selectively positioned relative to the discharge port to regulate the flow of material. In other words, the shutter (or gate) may be moved to allow a greater or lesser amount of material to pass through the discharge port. In any event, such a construction for a broadcast spreader is well-known and understood by one of ordinary skill in the art. For example, U.S. Patent Publication No. 2002/0162907, which is incorporated herein by reference, provides a detailed list of prior art references that describe the construction of a common broadcast spreader. For other examples, reference is made to U.S. Pat. No. 7,063,280 entitled "Broadcast Spreader with a Directional Control Assembly" and U.S. patent application Ser. No. 12/209,755 also entitled "Broadcast Spreader with a Directional Control Assembly," each of which are assigned to the assignee of the present application and are also incorporated herein by reference.

However, it is recognized that most broadcast spreaders do not provide for effective control of the transfer of granular material from the hopper to the rotating fan. For instance, once the gate is opened, granular material immediately flows from the hopper and through the discharge port, regardless of whether the fan has been activated. Or, in other instances, the material "clumps up," effectively blocking the discharge port, such that although the fan is activated, insufficient material is reaching the fan for distribution.

SUMMARY OF THE INVENTION

The present invention is a broadcast spreader, and, more particularly, a broadcast spreader that not only provides for effective control of the flow of granular material to a rotating fan through use of a gate assembly in combination with an auger assembly, but also allows for the shifting of the distribution pattern of the granular material from side to side.

An exemplary broadcast spreader made in accordance with the present invention includes a hopper, with granular material stored in the hopper passing through a discharge port defined through a bottom surface of the hopper. The granular material is then distributed onto a rotating fan which propels the material onto a lawn, field, pasture, paved surface, or other outdoor surface.

To control the opening and closing of the discharge port, a gate assembly is secured to the underside of the hopper. In one exemplary embodiment, the gate assembly includes a hopper plate that is secured to the hopper. This hopper plate has a central opening that is in registry with the discharge port defined through the bottom surface of the hopper. A gate is then secured to the underside of the hopper plate, with the gate adapted for sliding movement relative to the hopper plate and the underside of the hopper. The gate includes an opening that can be placed in registry with the central opening of the hopper plate and the discharge port as the gate is slid between a first (closed) position and a second (open) position. Such sliding movement of the gate may be facilitated by a gate linkage operably connected to the gate such that, as the gate linkage is moved forward or rearward, the gate is also moved forward or rearward relative to the hopper plate and the underside of the hopper. To ascertain the appropriate forward and rearward movement of the gate, an adjustment dial may be used. The adjustment dial is secured to a dial bracket such that the adjustment dial can rotate relative to the dial bracket. The dial bracket is then secured to the hopper plate (or hopper). In practice, a user can thus rotate the adjustment dial to a desired setting, and then advance the gate linkage forward until a vertically extending projection of the gate linkage contacts and engages the face of the adjustment dial. Because the depth of the adjustment dial varies based on its rotational position, the amount that the gate is "open" will vary depending on the position of the adjustment dial. Thus, by rotating the adjustment dial and moving the gate linkage accordingly, the user can set and control the flow of granular material through the gate and to the fan.

An auger assembly is then positioned below and secured to the gate assembly. In one exemplary embodiment, the auger assembly is generally comprised of first and second housing sections, an auger tube, an auger chute, and an auger. The first and second housing sections collectively surround and enclose the auger tube; however, the auger tube can continue to rotate relative to the first and second housing sections. The auger chute is then secured to the auger tube, preferably in a manner than allows for a limited ability to pull the auger chute down and away from the auger tube. There are teeth defined along the upper, rear edge of the auger chute, and there are also corresponding teeth defined along the lower, rear edge of the housing sections. When these teeth engage one another, the rotational position of the auger tube and the auger chute is fixed relative to the housing sections. However, by pulling the auger chute down and away from the auger tube, the auger tube and the auger chute can be rotated together relative to the first and second housing sections, thus allowing the rotational position of the auger tube and the auger chute to be changed by the user.

The auger is received in the auger tube above the auger chute. The auger is not secured to the other components of the auger assembly, but instead is coupled to a shaft so that it can rotate within the auger tube. To effectuate rotation the auger and the fan that is positioned below the auger, a motor is coupled to a shaft, and the auger and the fan are both coupled to the shaft, such that rotation of this shaft causes rotation of both the auger and the fan.

As a result of such a construction, it should be recognized that the granular material is prevented from further flow to the fan by the auger, and thus, the auger serves as a second "stop" for the granular material. However, when the auger is rotated (by activating the motor), the granular material is then forced downward into the auger chute, where it is then directed onto the fan.

With respect to the movement of the granular material from the auger to the fan, as described above, the auger tube and the auger chute can be rotated relative to the underside of the hopper. As such, a directional control means is provided which allows for a shifting of the pathway for the granular material onto the fan, thus altering the direction of the distribution pattern.

DETAILED DESCRIPTION OF THE INVENTION

The present invention is a broadcast spreader, and, more particularly, a broadcast spreader that not only provides for effective control of the flow of granular material to a rotating fan through use of a gate assembly in combination with an auger assembly, but also allows for the shifting of the distribution pattern of the granular material from side to side.

Figure 3:
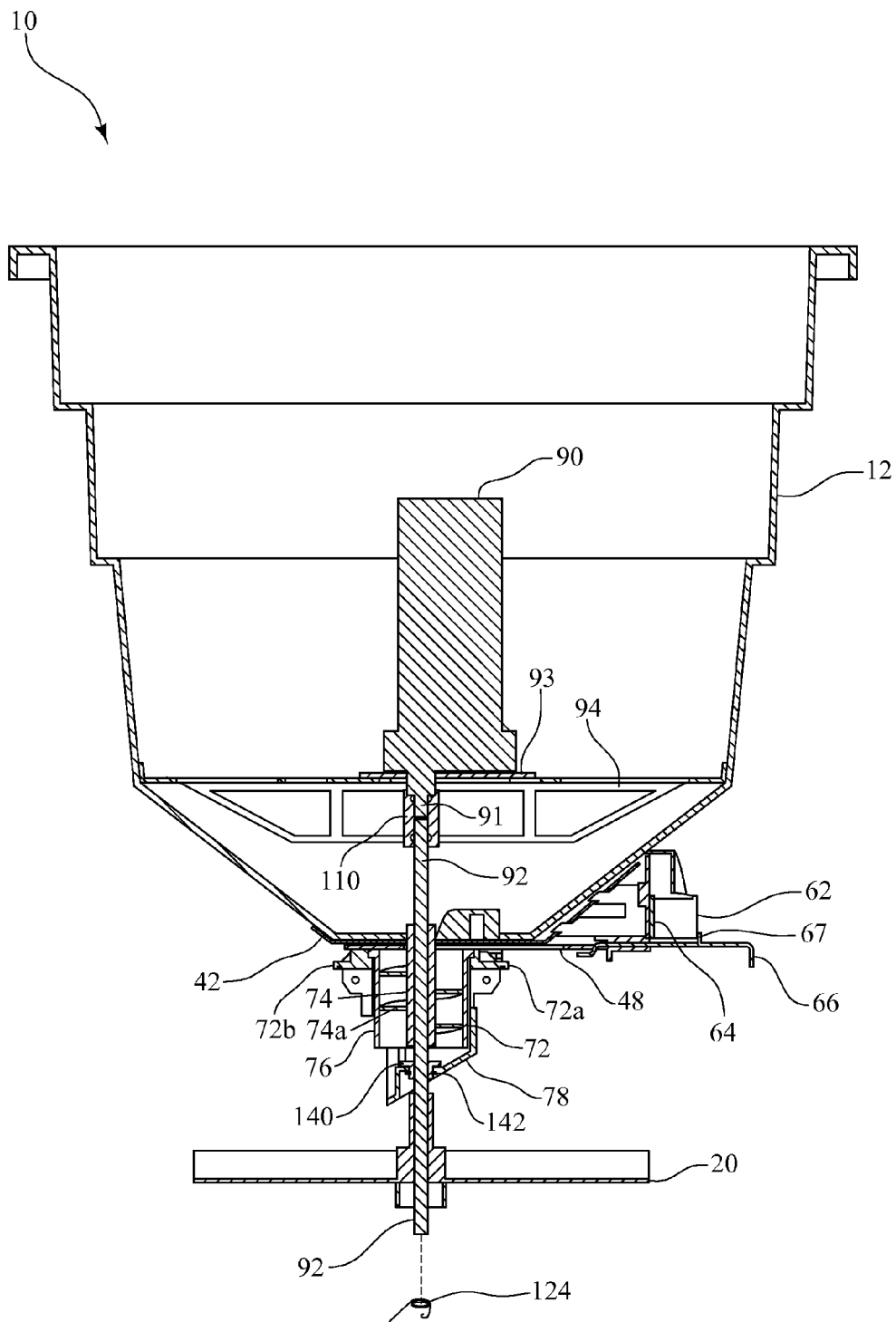
FIG. 3 is a sectional view of the exemplary broadcast spreader of FIG. 1, but with certain fasteners and other minor details omitted for clarity.
Figure 4:
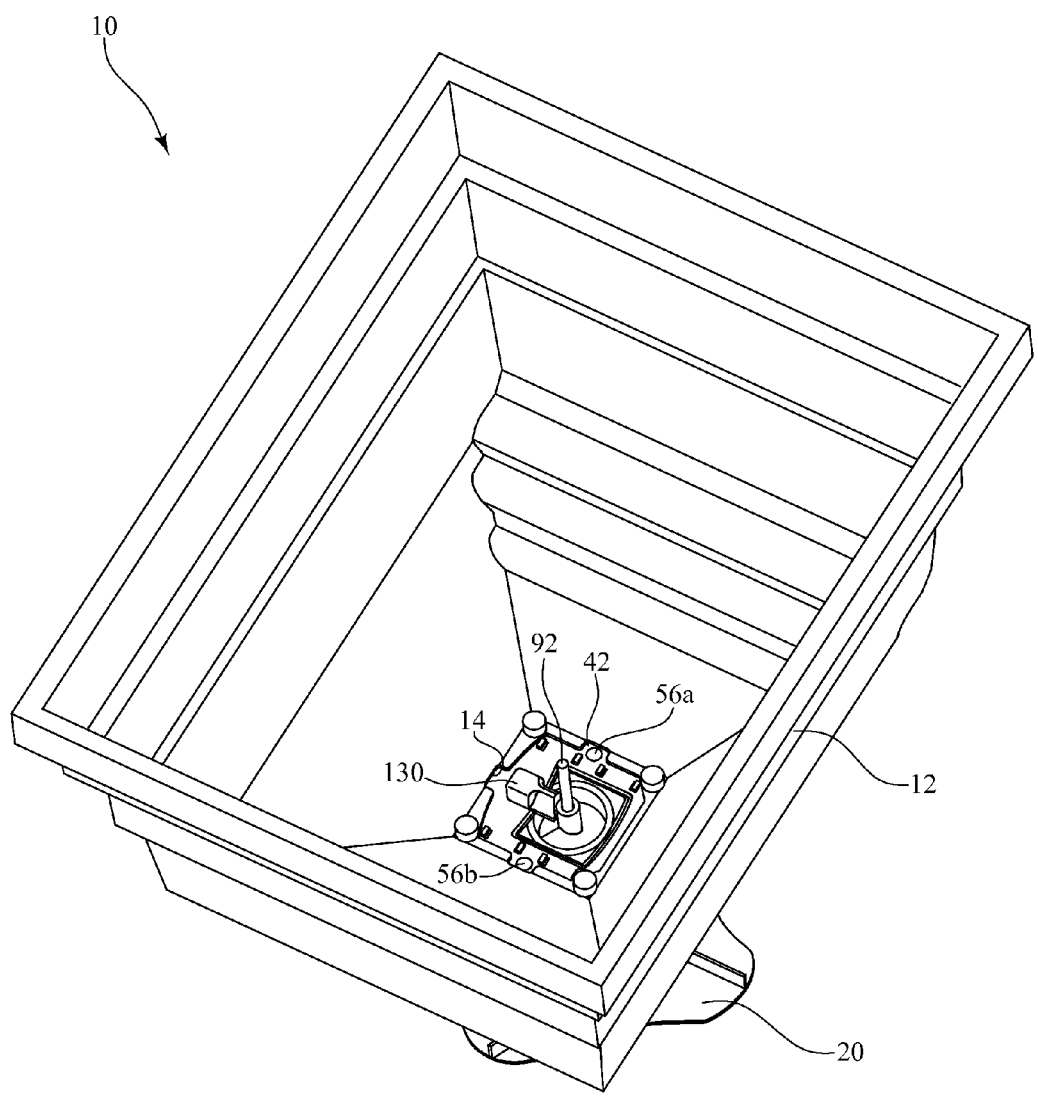
FIG. 4 is a top perspective view of the exemplary broadcast spreader of FIG. 1.

FIGS. 1-5 are various views of an exemplary broadcast spreader 10 made in accordance with the present invention. The exemplary broadcast spreader 10 includes a hopper 12 (or bucket). Like most broadcast spreaders, the exemplary broadcast spreader 10 includes a discharge port (or opening) 14 (as shown in FIG. 4) defined through a bottom surface of the hopper 12, with the granular material stored in the hopper 12 passing through this discharge port 14 (FIG. 4) under the force of gravity and then being distributed onto a rotating fan (or spinner) 20 which propels the material onto a lawn, field, pasture, paved surface, or other outdoor surface. With respect to the term "granular material," this term is intended to be a generic descriptor of the types of materials that can be distributed using a broadcast spreader, and the term "granular material" includes, but is not limited to, seed, fertilizers, pelletized lime, insecticides, salts, ice melts, and/or mulch. With respect to the discharge port 14, it should also be recognized that the discharge port 14 could be comprised of multiple discrete openings defined through the bottom surface of the hopper 12 without departing from the spirit and scope of the present invention.

To control the opening and closing of the discharge port 14, a gate assembly 40 is secured to the underside of the hopper 12. Referring now to the exploded perspective view of FIG. 6, in this exemplary embodiment, the gate assembly 40 includes a hopper plate 42 that is secured to the hopper 12 with one or more bolts or similar fasteners 41a, 41b, 41c, 41d. This hopper plate 42 has a central opening (or openings) 44 that is in registry with the discharge port 14 defined through the bottom surface of the hopper 12 (FIG. 4). Multiple gate guides 46a, 46b, 46c, 46d are then used to secure a gate 48 to the underside of the hopper plate 42, with the gate 48 adapted for sliding movement relative to the hopper plate 42 and the underside of the hopper 12. In this exemplary embodiment, the gate guides 46a, 46b, 46c, 46d are snapped into receiving slots (shown in FIG. 6) defined by the hopper plate 42. The gate 48 includes an opening 50 that can be placed in registry with the central opening (or openings) 44 of the hopper plate 42 and the discharge port 14 as the gate 48 is slid between a first (closed) position and a second (open) position. To ascertain the appropriate forward and rearward movement of the gate 48, a gate adjustment assembly 60 may be used, comprising an adjustment dial 62, a dial bracket 64, and a gate linkage 66, as is further described below.

An auger assembly 70 is then positioned below and secured to the gate assembly 40. Specifically, in this exemplary embodiment, two bolts 56a, 56b pass through corresponding holes 43a, 43b defined through the hopper plate 42 and then pass through corresponding holes defined through the upper surface of the first and second housing sections 72a, 72b (described below) of the auger assembly 70. The bolts 56a, 56b are provided with corresponding washers 57a, 57b and lock washers 58a, 58b, and then are secured by corresponding T-knobs 59a, 59b. These T-knobs 59a, 59b allow for ready attachment or removal of the auger assembly 70 from the hopper 12, provided that the auger assembly 70 has been disengaged from the shaft 92 (as described below).

Figures 2, 6:
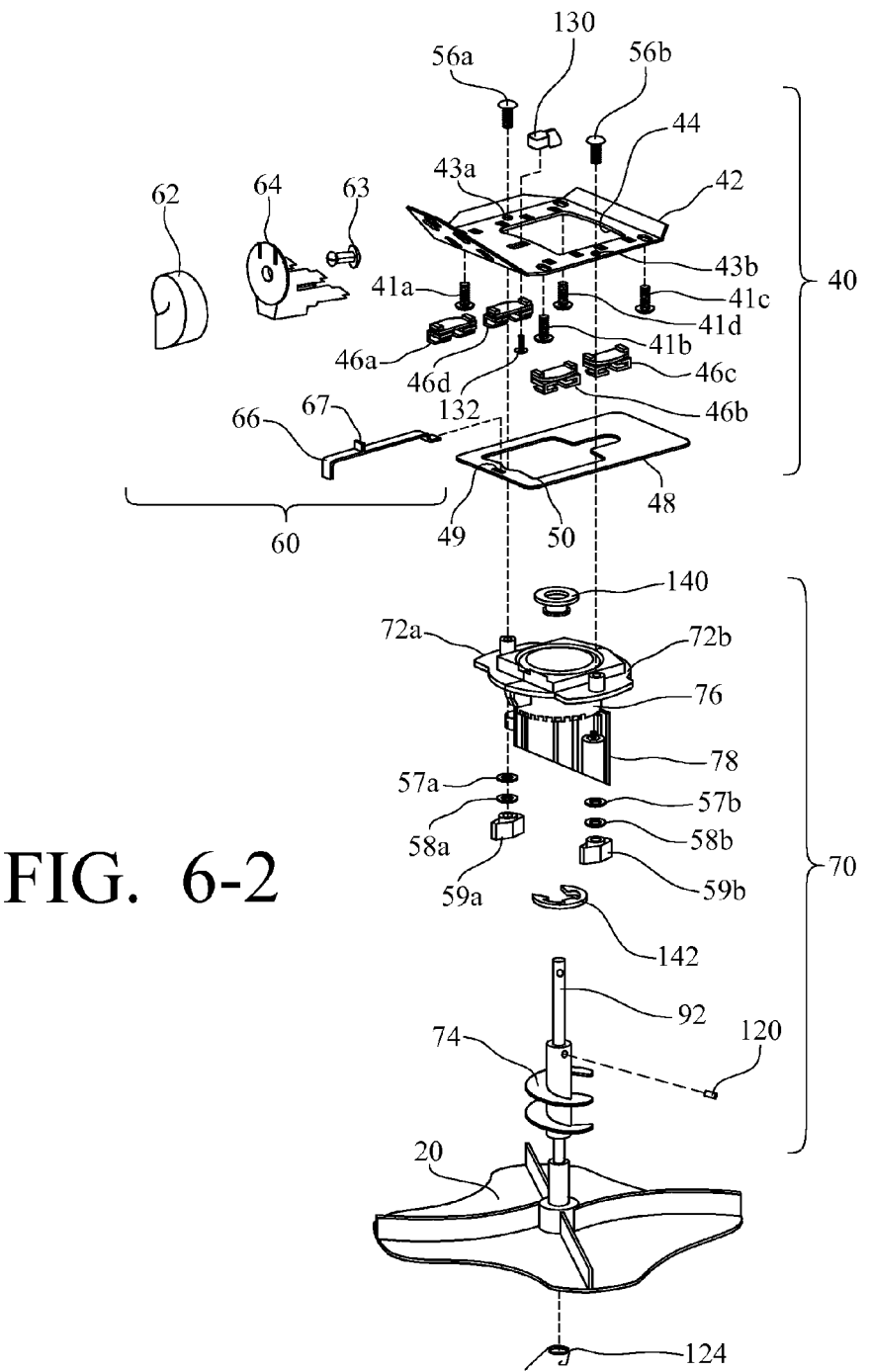
FIG. 6 is an exploded perspective view of the exemplary broadcast spreader of FIG. 1.
Figure 6A:
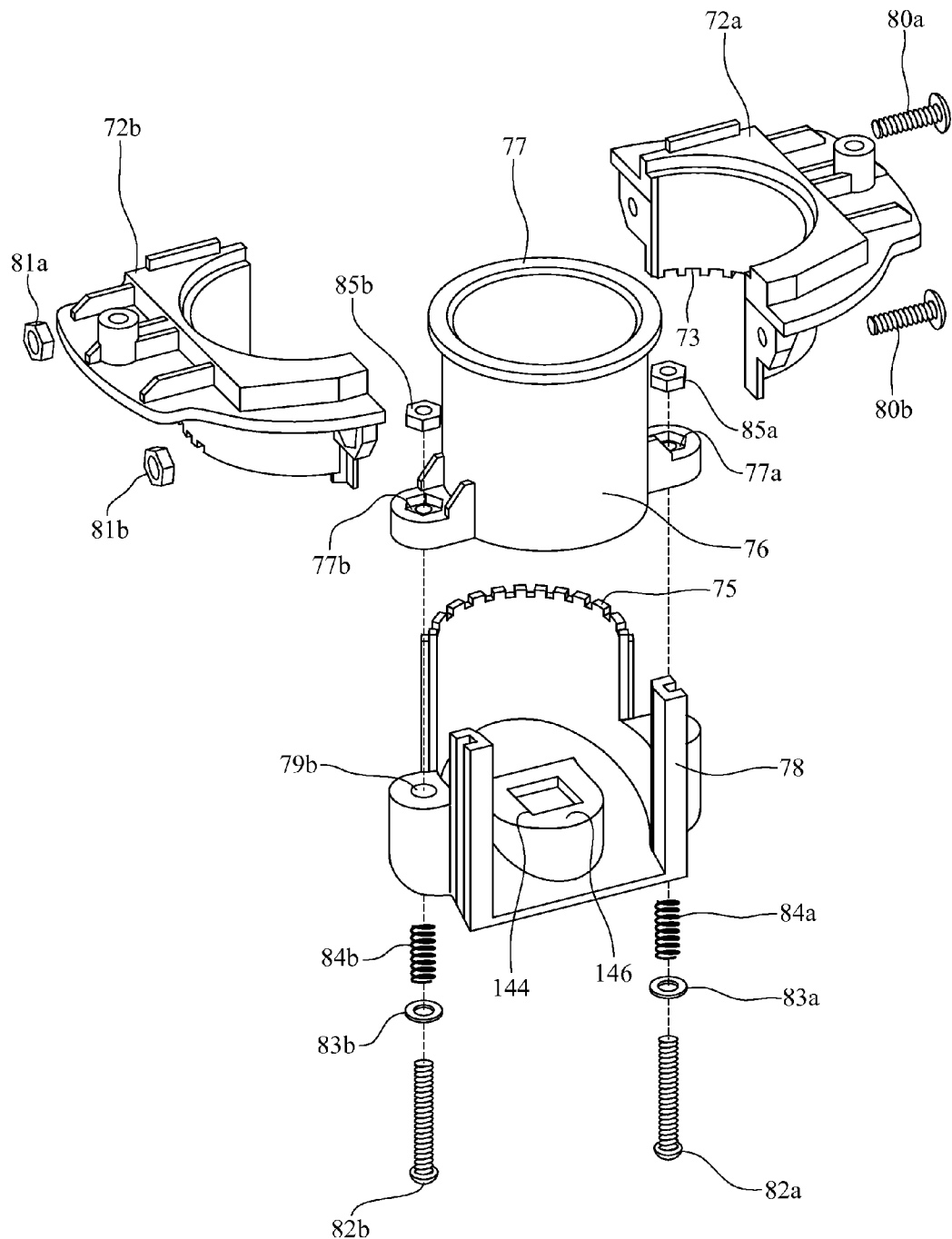
FIG. 6A is an exploded perspective view of the auger assembly of the exemplary broadcast spreader of FIG. 1.

Referring now to FIG. 6A, in this exemplary embodiment, the auger assembly 70 is generally comprised of first and second housing sections 72a, 72b, an auger tube 76, an auger chute 78, and an auger 74 (which is not shown in FIG. 6A, but is shown in FIG. 6 and is further described below). The first and second housing sections 72a, 72b collectively surround and enclose the auger tube 76. In this exemplary embodiment, the first and second housing sections 72a, 72b are secured together and around the auger tube 76 by bolts 80a, 80b, which pass through the respective housing sections 72a, 72b and engage corresponding nuts 81a, 81b. However, the auger tube 76 can continue to rotate relative to the first and second housing sections 72a, 72b, the importance of which is described below.

The auger chute 78 is then secured to the auger tube 76. In this exemplary embodiment, the auger chute 78 is secured to the auger tube 76 by a pair of bolts 82a, 82b. Each bolt 82a, 82b first passes through a corresponding washer 83a, 83b and a spring 84a, 84b. Each bolt 82a, 82b then passes through a respective channel 79b (only one of which is shown in FIG. 6A) defined through the auger chute 78 and an opening 77a, 77b defined by the auger tube 76, and is then secured by a corresponding nut 85a, 85b. When assembled in this manner, the bolts 82a, 82b are advanced through the nuts 85a, 85b until a predetermined length of each bolt 82a, 82b extends from each nut 85a, 85b. As a result of the use of such spring-loaded fasteners, there remains a limited ability to pull the auger chute 78 down and away from the auger tube 76, for example, 1.7 mm (or 0.07 inches).

Referring still to FIG. 6A, there are teeth 75 defined along the upper, rear edge of the auger chute 78. There are corresponding teeth 73 defined along the lower, rear edges of the respective housing sections 72a, 72b. When these teeth 75, 73 engage one another, the rotational position of the auger tube 76 and the auger chute 78 is fixed relative to the housing sections 72a, 72b. However, by pulling the auger chute 78 down and away from the auger tube 76, the auger tube 76 and the auger chute 78 can be rotated together relative to the first and second housing sections 72a, 72b, thus allowing the rotational position of the auger tube 76 and the auger chute 78 to be changed by the user. In this regard, when the auger chute 78 is pulled downward, it should be recognized that the upper circumferential flange 77 of the auger tube 76 prevents its downward movement relative to the first and second housing sections 72a, 72b, and thus, the auger chute 78 is pulled away from the auger tube 76. Then, once the user releases the auger chute 78, the springs 84a, 84b act to press the teeth 75 defined along the upper, rear edge of the auger chute 78 back into engagement with the corresponding teeth 73 defined along the lower, rear edges of the respective housing sections 72a, 72b, again fixing the rotational position of the auger tube 76 and the auger chute 78 relative to the housing sections 72a, 72b. In this regard, it should be noted that each spring 84a, 84b is enclosed within one of the channels 79b defined through the auger chute 78 and is positioned between the corresponding washer 83a, 83b and an interior flange (not shown) within the respective channel. Thus, when the auger chute 78 is pulled down and away from the auger tube 76, each spring 84a, 84b is compressed between the corresponding washer 83a, 83b and the interior flange. Once the user releases the auger chute 78, the springs 84a, 84b provide a biasing force to press the teeth 75, 73 back into engagement.

Referring again to the exploded perspective view of FIG. 6, the auger 74 is received in the auger tube 76 above the auger chute 78. The auger 74 is not secured to the other components of the auger assembly 70, but instead is coupled to a shaft 92 so that it can rotate within the auger tube 76. Furthermore, as best shown in the sectional view of FIG. 3, the helical flight 74a of the auger 74 extends to an inner wall surface of the auger tube 76. Returning to FIG. 6, to effectuate rotation of the auger 74 and the fan 20 that is positioned below the auger 74, a motor 90 is operably coupled to a shaft 92, as is further described below. The auger 74 and the fan 20 are both coupled to this shaft 92, such that rotation of the shaft 92 causes rotation of both the auger 74 and the fan 20.

In this exemplary embodiment, the motor 90 is positioned in the hopper 12 and secured to the hopper 12 by a bracket 94. Specifically, the motor 90 includes multiple bolts 100a, 100b, 100c (and a fourth bolt that is not shown in FIG. 6) that extend from a bottom surface of the motor housing. These bolts 100a, 100b, 100c pass through a bottom plate 93 and then are secured with corresponding washer and nut assemblies 101a, 101b, 101c, 101d. The bottom plate 93 is then secured to the bracket 94 by two bolts 102a, 102b that pass through corresponding openings defined through the bottom plate 93 and the bracket 94, and then are secured by corresponding washer and nut assemblies 103a, 103b.

In this exemplary embodiment, the bracket 94 is then secured to the interior of the hopper 12 using multiple bolts 104a, 104b, 104c, 104d that each pass through a corresponding washer 105a, 105b, 105c, 105d, through the side wall of the hopper 12, through corresponding holes defined through the bracket 94, and then engage a corresponding nut 106a, 106b, 106c, 106d to secure the bracket 94 to the hopper 12.

The motor shaft 91 extends downward and is coupled to the shaft 92. In this exemplary embodiment, this is achieved by a coupling 110 that is secured to the motor shaft 91 by a set screw 112 and is secured to the shaft 92 by a cotter pin 114 (which also facilitates ready attachment or removal of the shaft 92 and associated fan 20). The auger 74 defines a central longitudinal channel such that it can be slid over the distal end of the shaft 92 and secured in place with a set screw 120. Similarly, the fan 20 defines a central longitudinal channel such that it can be slid over the distal end of the shaft 92, with the shaft 92 extending through the fan 20. A spring clip 124 can then be placed over the shaft 92 below the fan 20 to maintain the fan 20 on the shaft 92. Thus, once assembled, the shaft 92 extends through the discharge port 14 defined by the hopper 12, through the components of the gate assembly 40, and through the components of the auger assembly 70.

Furthermore, as shown in the exploded perspective view of FIG. 6 and the top perspective view of FIG. 4, there is a tab 130 that is positioned over the hopper plate 42, overlapping the central opening 44 defined by the hopper plate 42. The tab 130 is secured in position by a set screw 132 that passes through a hole defined through the hopper plate 42. This tab 130 serves as to guide and center the shaft 92.

Similarly, as shown in the exploded perspective view of FIG. 6 and the sectional view of FIG. 3, in this exemplary embodiment, there is a fan shaft bearing 140 that fits over the shaft 92 and is positioned in the auger chute 78, where it is secured by a clip 142. Specifically, the lower portion of the fan shaft bearing 140 passes through an internal opening 144 (as shown in FIG. 6A) defined by the auger chute 78, such that the upper portion of the fan shaft bearing 140 rests on and is supported by a ledge 146 (as also shown in FIG. 6A) surrounding this internal opening 144. Then, the clip 142 is secured over the lower portion of the fan shaft bearing 140, securing it relative to the auger chute 78. This fan shaft bearing 140 ensures that the shaft 92 is appropriately aligned as it passes through the auger assembly 70.

Figure 7:
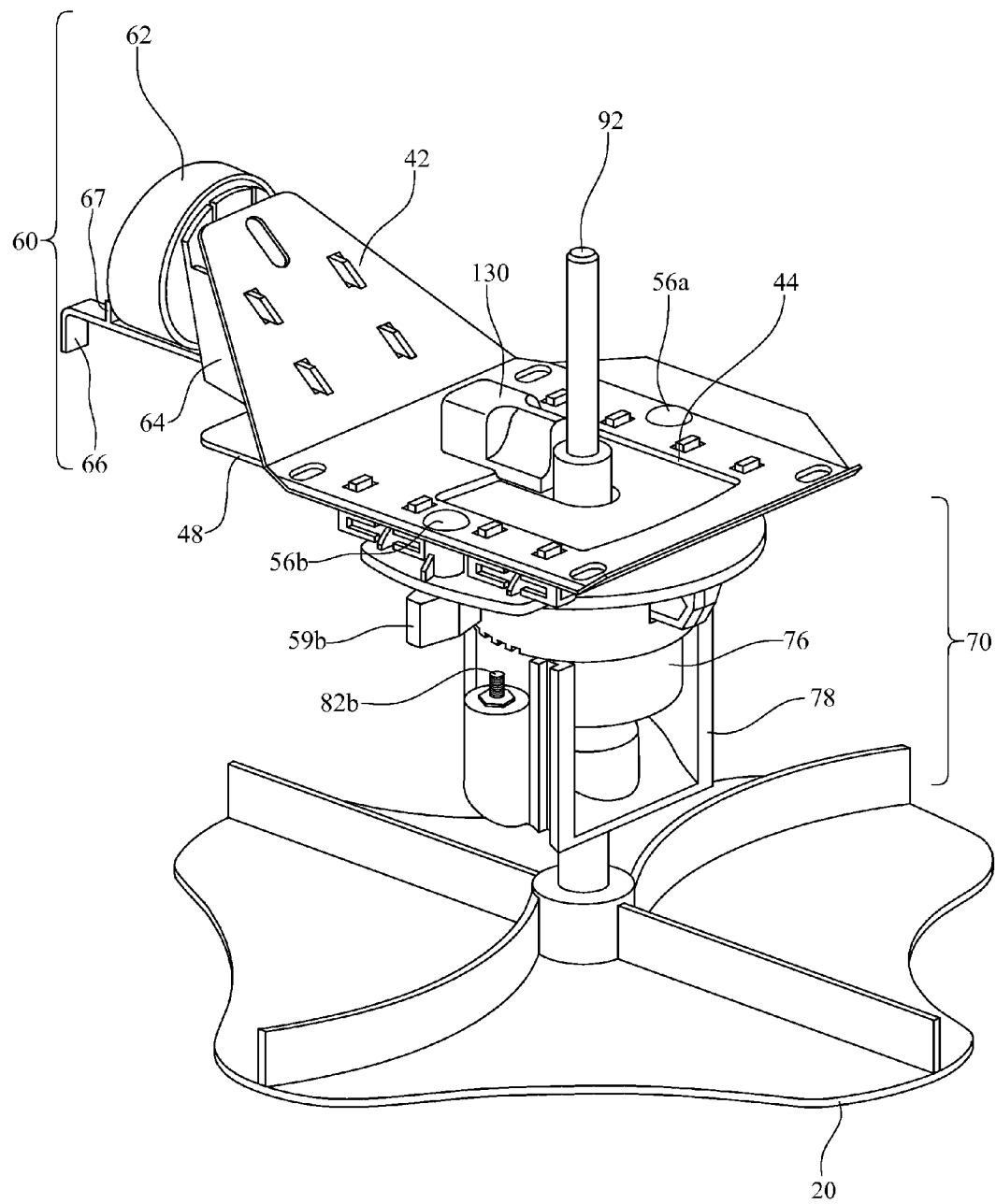
FIG. 7 is a perspective view of the auger assembly and the fan of the exemplary broadcast spreader of FIG. 1, with the gate in a closed position.
Figure 8:
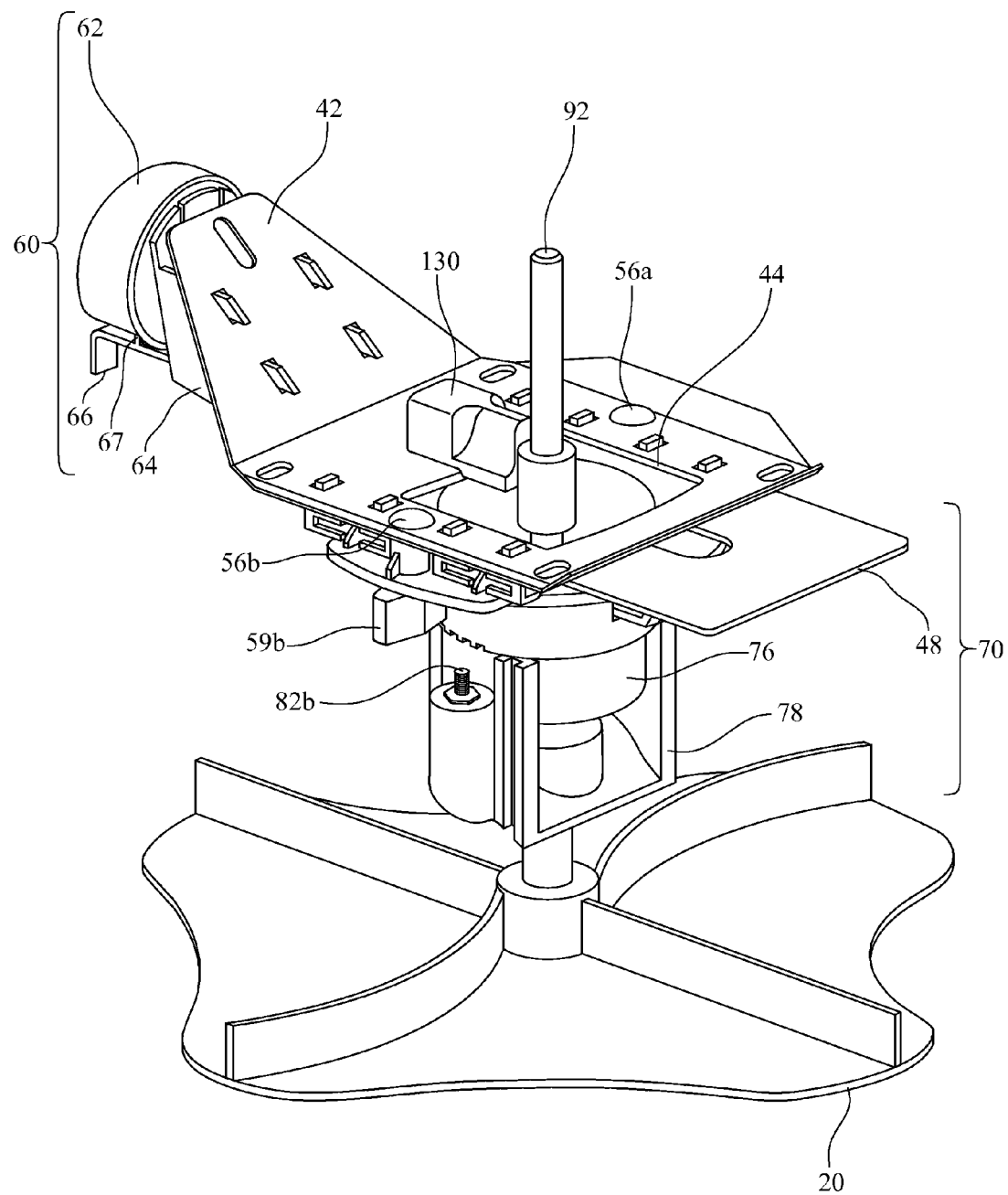
FIG. 8 is a perspective view of the auger assembly and the fan of the exemplary broadcast spreader of FIG. 1, with the gate in an open position.

Returning now to the discussion of the sliding movement of the gate 48, FIG. 7 is a perspective view of the auger assembly 70 and the fan 20 of the exemplary broadcast spreader 10 which illustrates the gate 48 in the first (closed) position. FIG. 8 is a perspective view of the auger assembly 70 and the fan 20 of the exemplary broadcast spreader 10 which illustrates the gate 48 in the second (open) position. As mentioned above, to facilitate sliding movement of the gate 48 and to ascertain the appropriate forward and rearward movement of the gate 48 between the first and second positions, a gate adjustment assembly 60 may be used. First, a gate linkage 66 is secured to the gate 48. In this exemplary embodiment, the gate linkage 66 includes a distal end with an L-shaped extension (as shown in FIG. 6) that can be manipulated into a slot 49 (as also shown in FIG. 6) defined through the gate 48 along its edge, thus operably connecting the gate linkage 66 to the gate 48. Thus, the gate linkage 66 can been moved forward or rearward, and the gate 48 is thus moved forward or rearward relative to the hopper plate 42. Then, to ascertain the appropriate forward and rearward movement of the gate 48, an adjustment dial 62 is used. This adjustment dial 62 is secured to the dial bracket 64 by a clip 63, such that the adjustment dial can rotate relative to the dial bracket 64. The dial bracket 64 is then secured to the hopper plate 42 (or hopper 12). In this exemplary embodiment, the dial bracket 64 is snapped into receiving slots (shown in FIG. 6) defined by the hopper plate 42. In practice, a user can thus rotate the adjustment dial 62 to a desired setting, and then advance the gate linkage 66 forward until a vertically extending projection 67 of the gate linkage 66 contacts and engages the face of the adjustment dial 62. Because the depth of the adjustment dial 62 varies based on its rotational position, the amount that the gate 48 is "open" (i.e., the area of overlap between the opening 50 defined by the gate 48 and central opening 44 of the hopper plate 42) will vary depending on the position of the adjustment dial 62. Thus, the user can set and control the flow of granular material through the gate and to the fan 20.

Of course, before advancing to the fan 20, the granular material is directed into the auger tube 76, and the granular material is prevented from further flow to the fan 20 by the auger 74. In short, with the helical flight 74a of the auger 74 extending to the inner wall of the auger tube 76, the auger 74 serves as a second "stop" for the granular material. However, when the auger 74 is rotated (by activating the motor 90), the granular material is then forced downward into the auger chute 78, where it is then directed onto the fan 20.

With respect to the delivery of the granular material from the auger 74 to the fan 20, as described above, the auger tube 76 and the auger chute 78 can be rotated relative to the underside of the hopper 12. As such, a directional control means is provided which allows for a shifting of the pathway for the granular material onto the fan 20, thus altering the direction of the distribution pattern.

Figure 9:
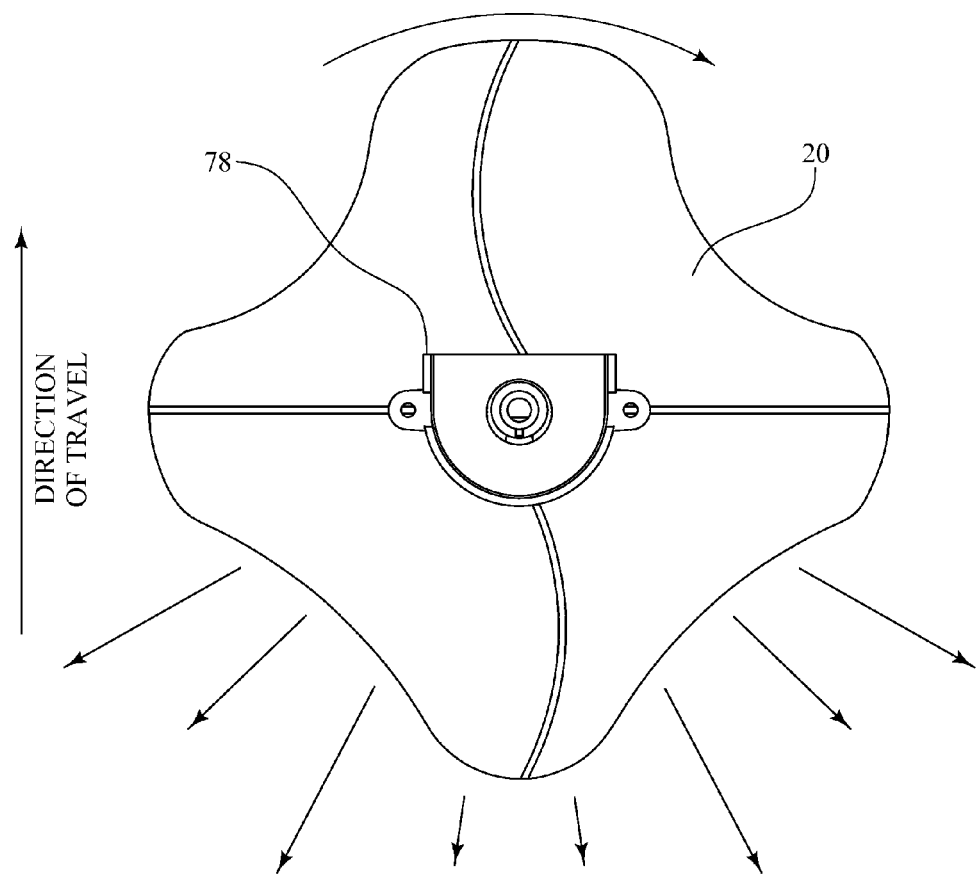
FIG. 9 is a plan view of the auger chute and the fan, illustrating the distribution pattern when the auger chute faces forward, i.e., in the direction of travel.

FIG. 9 is a plan view of the auger chute 78 and the fan 20, illustrating the distribution pattern when the auger chute 78 faces forward, i.e., in the direction of travel. As shown, the granular material would be distributed directly behind the broadcast spreader 10.

Figure 10:
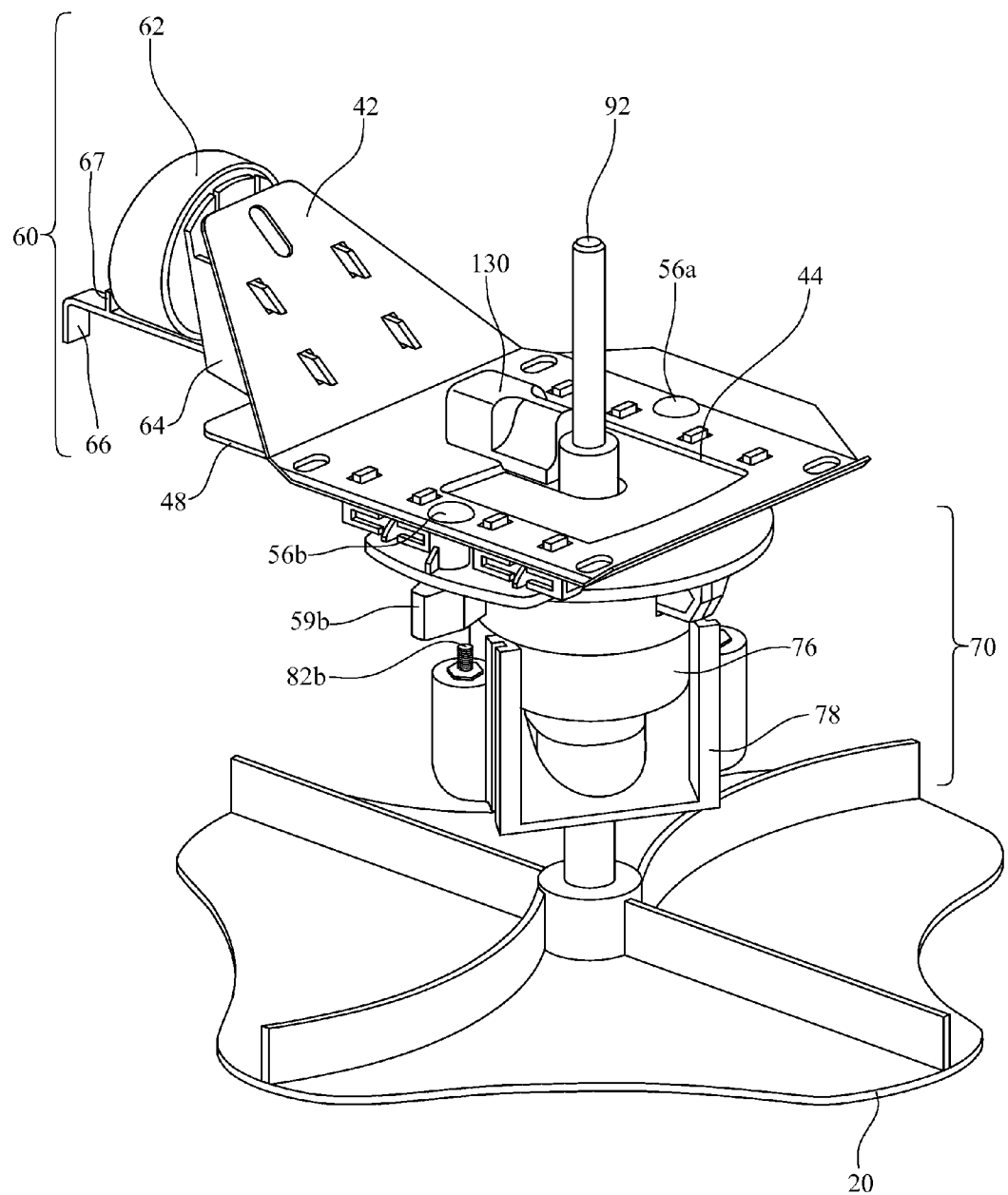
FIG. 10 is a perspective view similar to FIG. 7, but illustrates rotation of the auger chute clockwise (to the right relative to the direction of travel)
Figure 11:
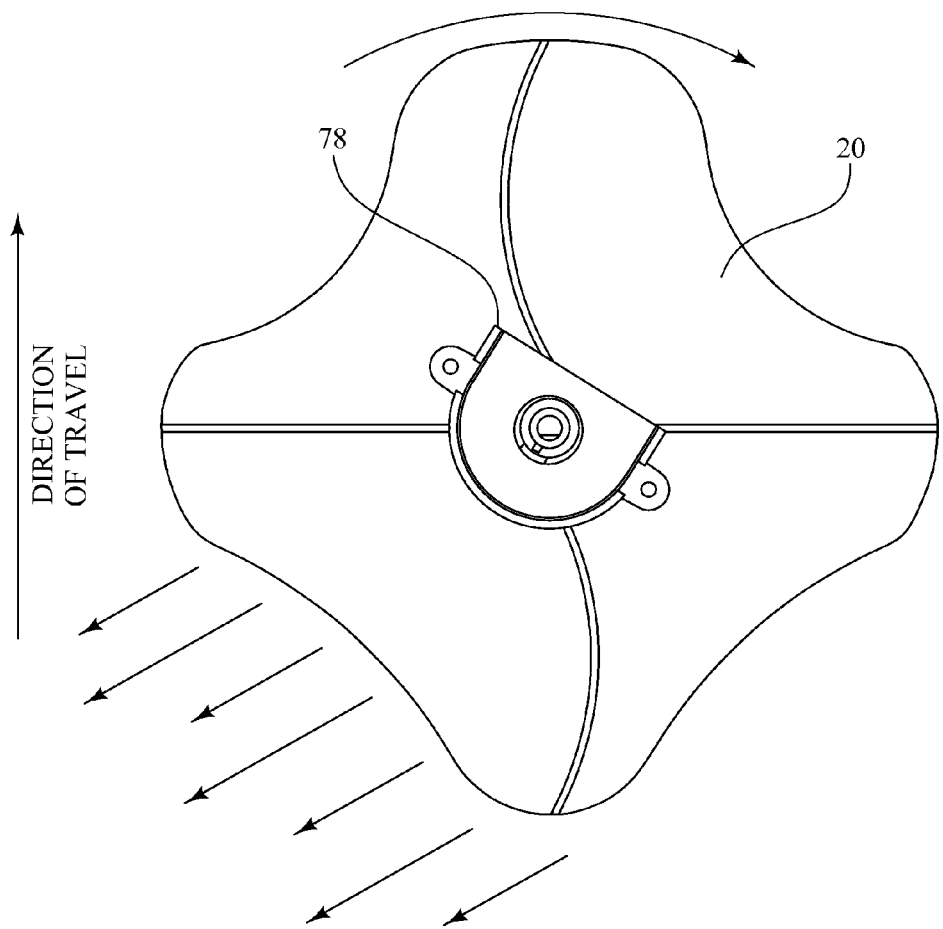
FIG. 11 is a plan view of the auger chute and the fan, illustrating the distribution pattern when the auger chute has been rotated clockwise (to the to the right relative to the direction of travel) as in FIG. 10.

FIG. 10 is a perspective view of the auger assembly 70 and the fan 20 similar to FIG. 7, but illustrates rotation of the auger chute 78 clockwise (to the right relative to the direction of travel). FIG. 11 is a plan view of auger chute 78 and the fan 20, illustrating the distribution pattern when the auger chute has been rotated clockwise (to the right relative to the direction of travel) as in FIG. 10 and the gate 48 opened.

Figure 12:
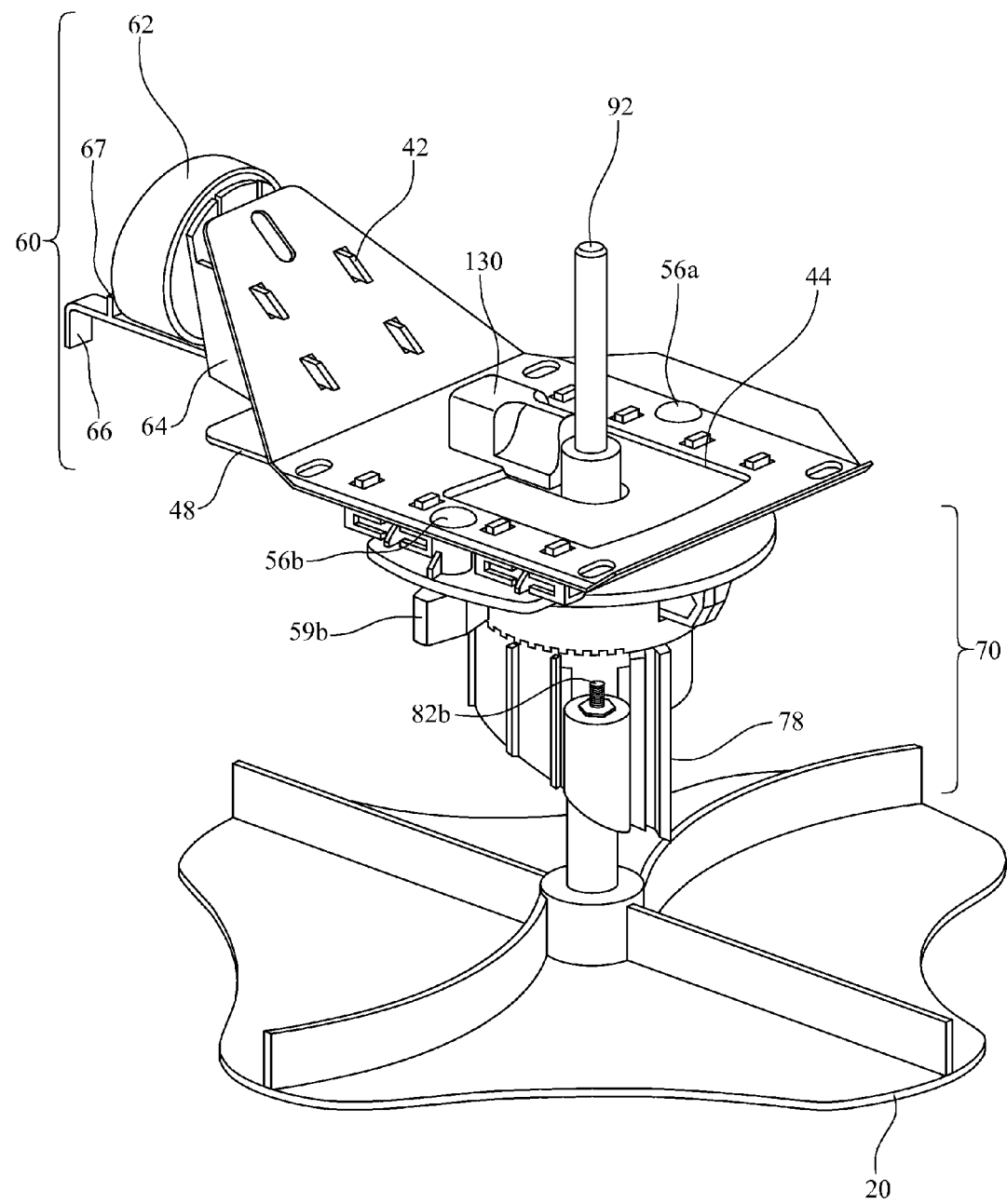
FIG. 12 is a perspective view similar to FIG. 7, but illustrates rotation of the auger chute counterclockwise (to the to the left relative to the direction of travel)
Figure 13:
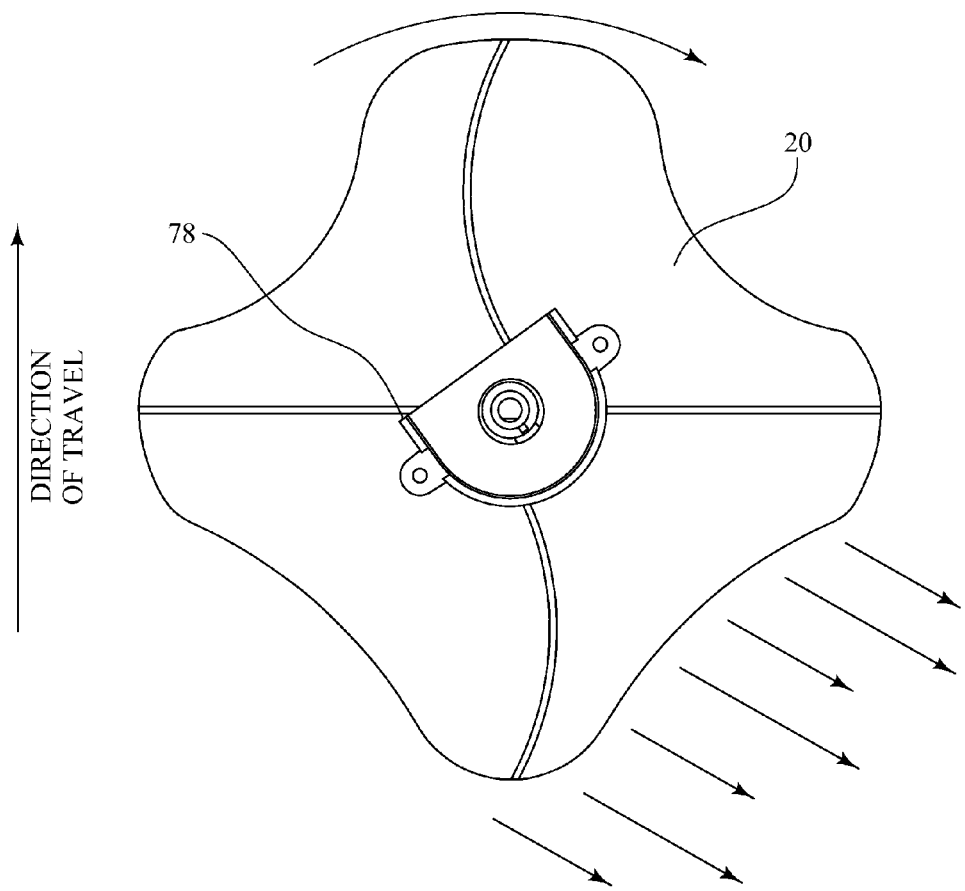
FIG. 13 is a plan view of the auger assembly and the fan, illustrating the distribution pattern when the auger chute has been rotated counterclockwise (to the to the left relative to the direction of travel) as in FIG. 12.

FIG. 12 is a perspective view of the auger assembly 70 and the fan 20 similar to FIG. 7, but illustrates rotation of the auger chute 78 counterclockwise (to the left relative to the direction of travel). FIG. 13 is a plan view of the auger chute 78 and the fan 20, illustrating the distribution pattern when the auger chute has been rotated counterclockwise (the left relative to the direction of travel) as in FIG. 12 and the gate 48 opened.

Thus, the broadcast spreader of the present invention not only provides for effective control of the flow of granular material to the fan 20 (on/off) through use of a gate assembly 40 in combination with an auger assembly 70, but also allows for the shifting of the distribution pattern of the granular material from side to side.

With respect to the directional control and the shifting of the distribution pattern from side to side, it is contemplated that other structures could be used in place of the auger chute 78 to direct granular material onto the fan 20 in a controlled manner (e.g., an inclined plane or conduit) without departing from the spirit and scope of the present invention.

Figure 5:
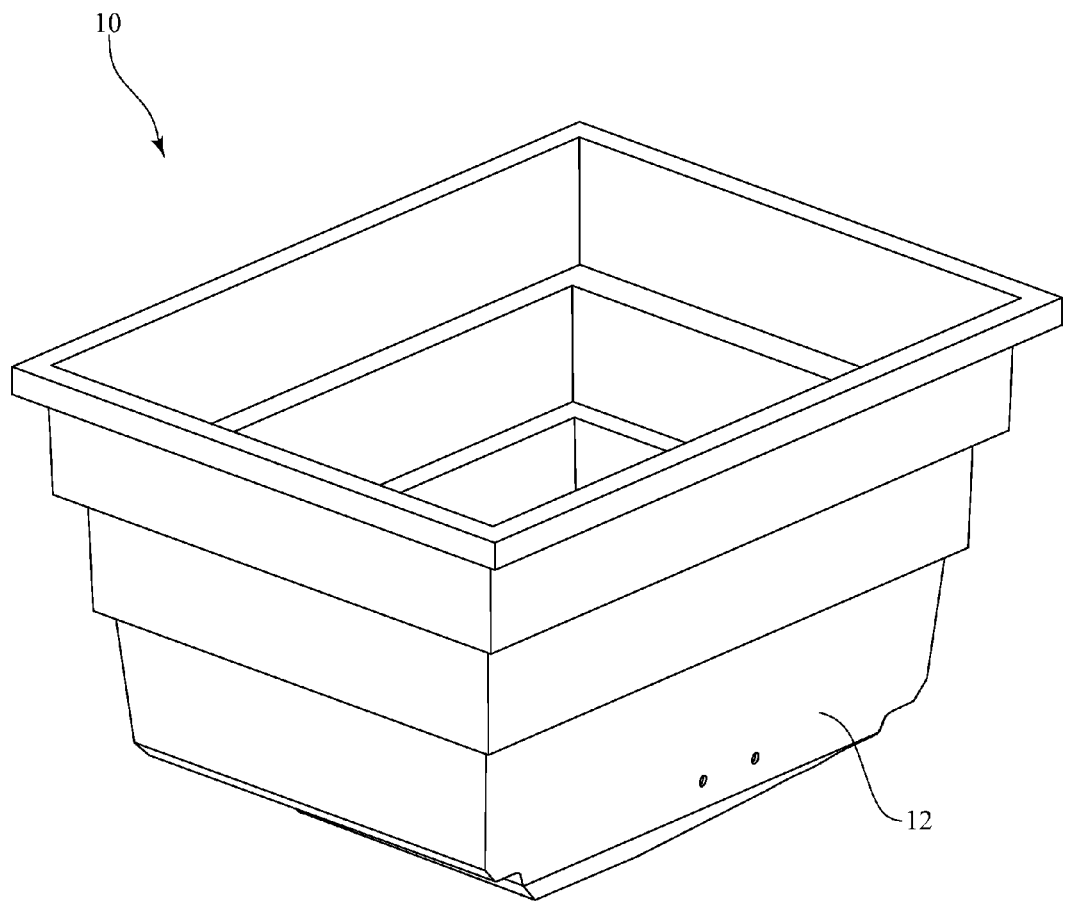
FIG. 5 is a perspective view similar to FIG. 1, but with the auger assembly and the fan disconnected and removed from the hopper.
Figure 5:
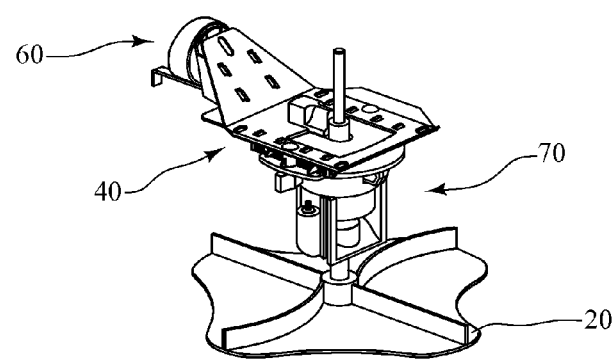

Furthermore, as a result of the construction described above, it should be recognized that the auger assembly 70 can be readily disconnected and removed (as shown in FIG. 5), so that the same broadcast spreader can be used for granular materials that can not be effectively metered and distributed using the auger assembly 70.

Figure 1:
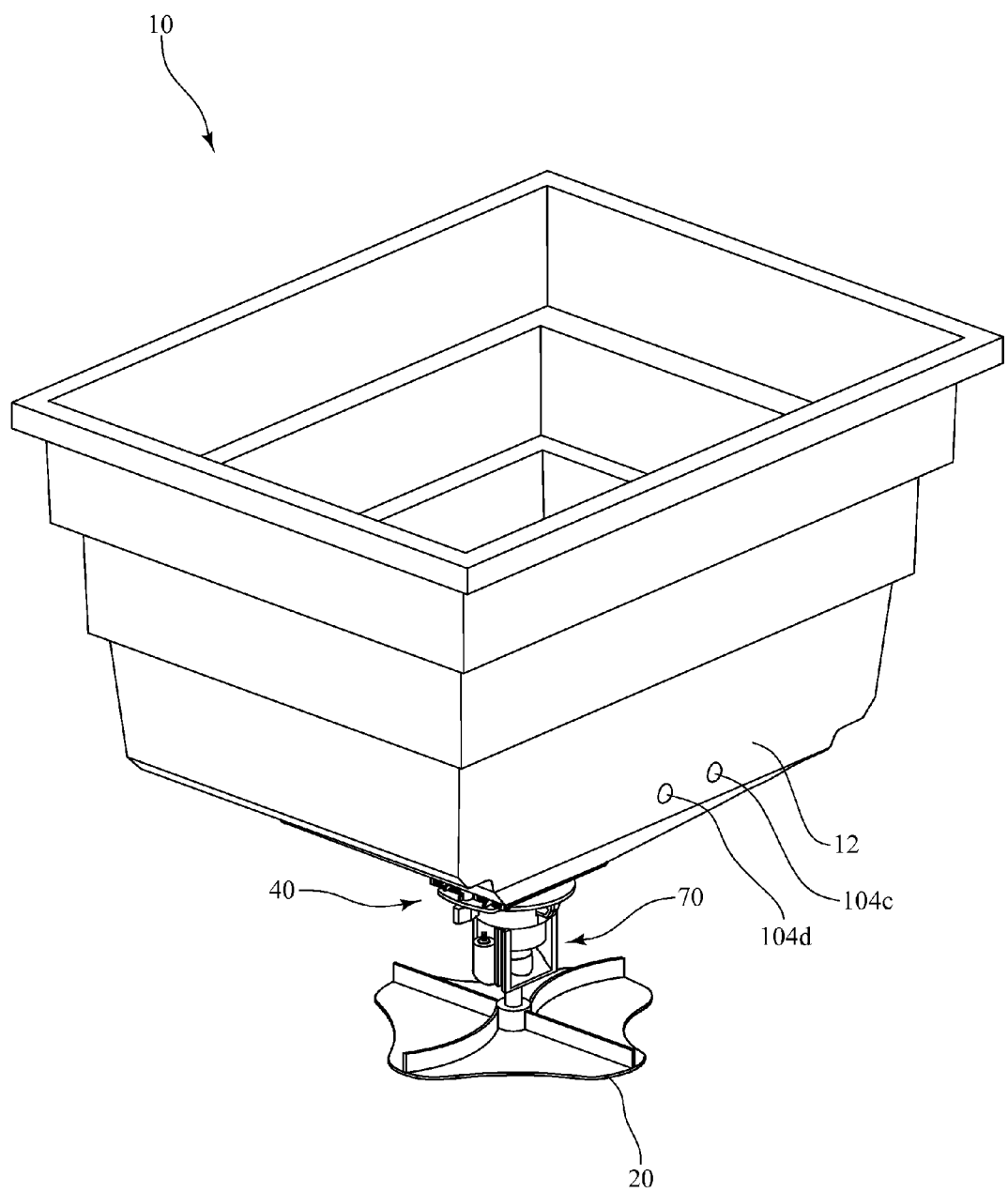
FIG. 1 is a perspective view of an exemplary broadcast spreader made in accordance with the present invention.
Figure 2:
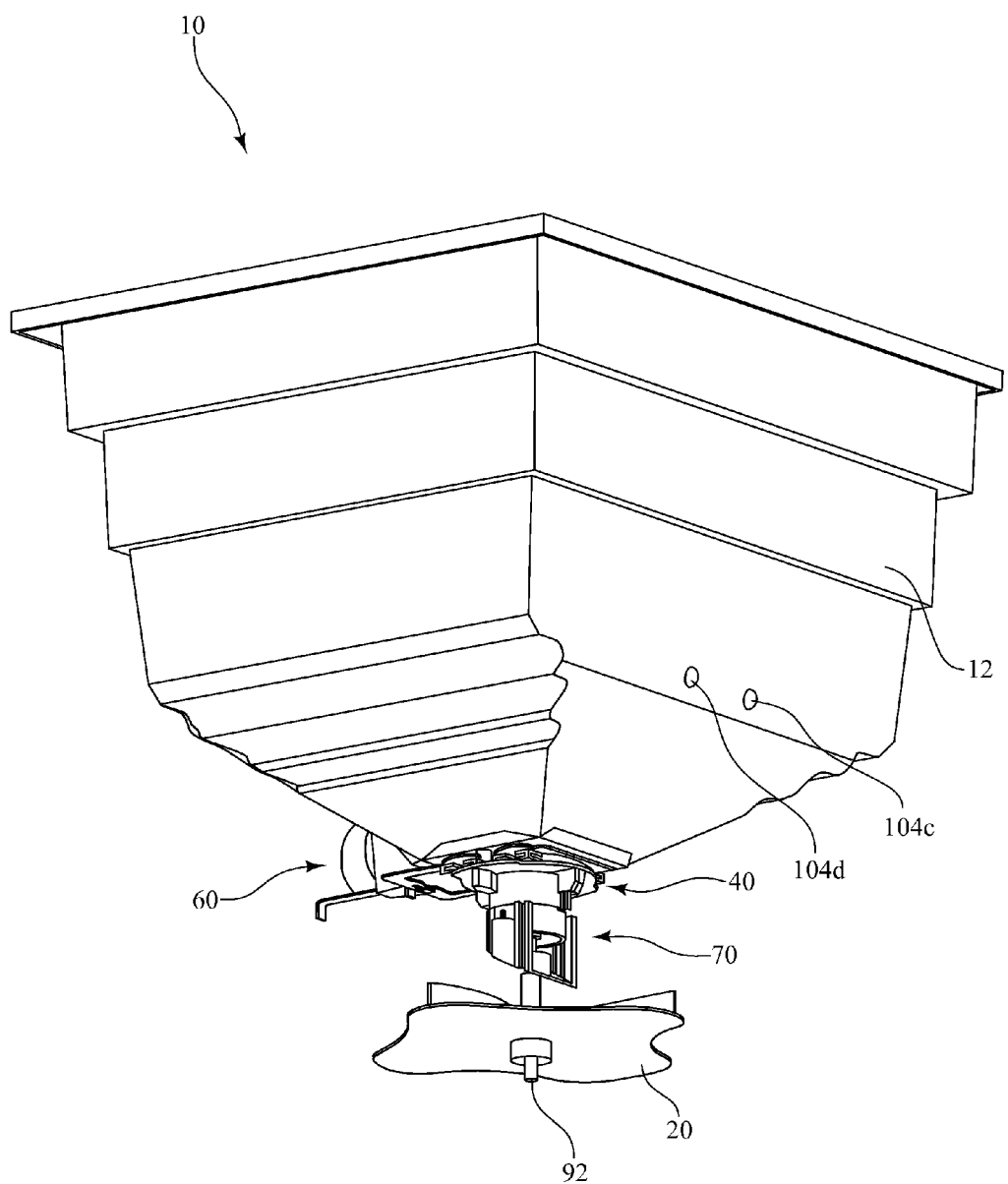
FIG. 2 is an alternate perspective view of the exemplary broadcast spreader of FIG. 1.
Figure 14:
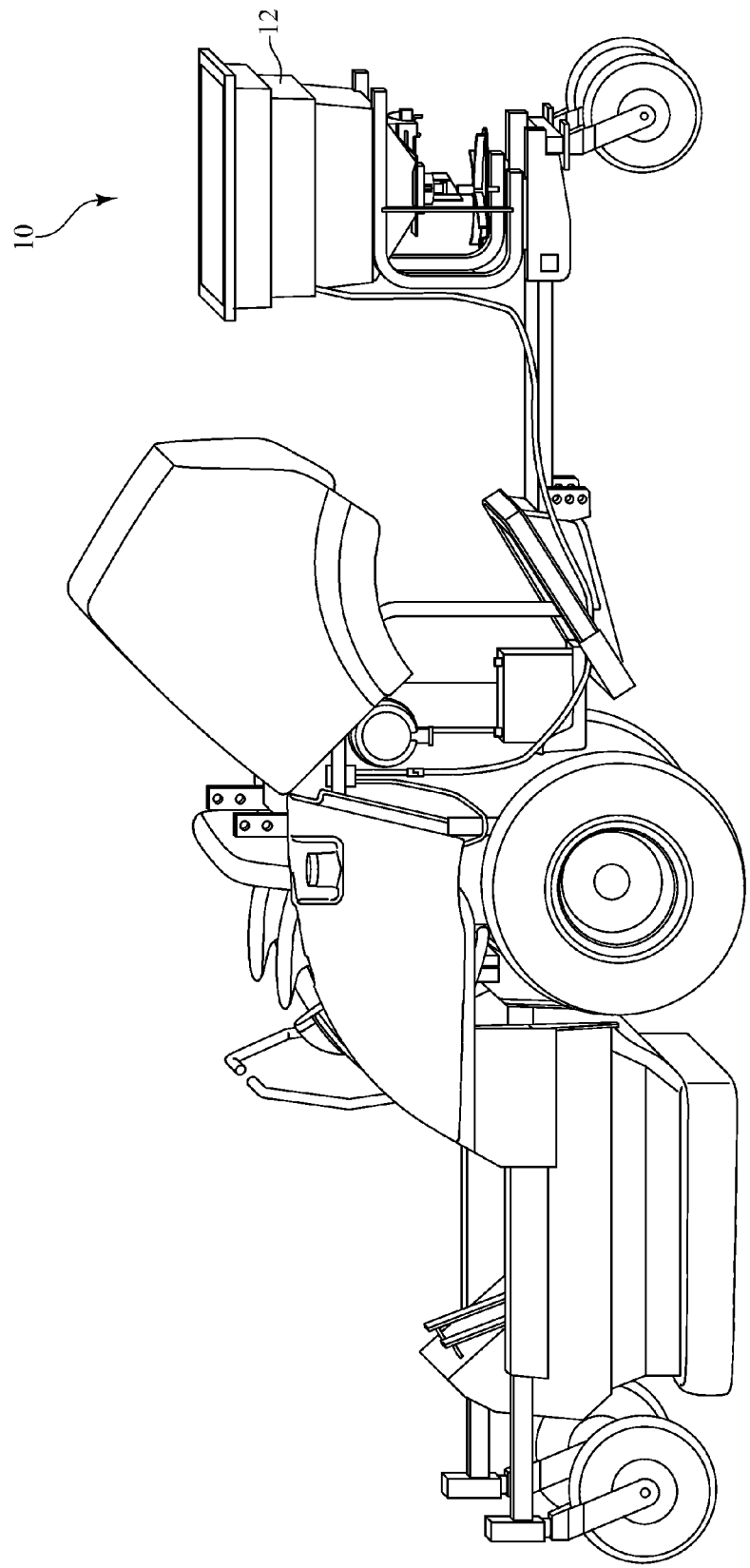
FIG. 14 illustrates the exemplary broadcast spreader of FIG. 1 as connected to and towed behind a zero-turn radius (ZTR) lawn mower.

Finally, FIG. 14 illustrates the exemplary broadcast spreader of FIG. 1 as connected to and towed behind a zero-turn radius (ZTR) lawn mower.

Although not shown in the Figures, some broadcast spreaders include a hopper that is supported on a frame with wheels, and thus towed behind a vehicle. For such broadcast spreaders, the movement of the wheels is utilized to drive the fan. Specifically, rotation of the fan is achieved through use of a transmission that couples the axle of the wheels of the broadcast spreader to the shaft that drives the fan. Through this same mechanism, the auger of the present invention could also be rotated, instead of using a motor.

One of ordinary skill in the art will also recognize that additional embodiments and configurations are also possible without departing from the teachings of the present invention or the scope of the claims which follow. This detailed description, and particularly the specific details of the exemplary embodiment disclosed, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A broadcast spreader, comprising:
   a hopper adapted to store granular material and including a discharge port through a bottom surface thereof;
   a gate including one or more openings that can be placed in registry with the discharge port for allowing flow of the granular material from the discharge port;
   an auger assembly positioned below the gate, including an auger received in an auger tube, with the granular material passing from the hopper through the discharge port and through the one or more openings defined by the gate into the auger tube;
   a means for rotating the auger within the auger tube;
   a fan rotating about an axis for receiving and distributing the granular material passing from the hopper through the discharge port, through the gate, and through the auger assembly as the auger rotates within the auger tube;
   a means for rotating the fan; and an auger chute that is secured to the auger tube and adapted for rotational movement relative to the hopper;

wherein the auger assembly further includes one or more housing sections, with the auger tube enclosed in the one or more housing sections, but adapted for rotational movement with respect to the one or more housing sections.

2. The broadcast spreader as recited in claim 1, in which the gate is secured to and adapted for sliding movement relative to the hopper.

3. The broadcast spreader as recited in claim 1, and further comprising teeth defined along an upper edge of the auger chute and corresponding teeth defined along a lower edge of the one or more housing sections, such that when the teeth defined along the upper edge of the auger chute engage the corresponding teeth defined along the lower edge of the one or more housing sections, a rotational position of the auger tube and the auger chute is fixed relative to the one or more housing sections and the hopper.

4. The broadcast spreader as recited in claim 3, in which the auger chute is secured to the auger tube by one or more spring-loaded fasteners, such that the auger chute can be pulled down and away from the auger tube, such that the teeth defined along the upper edge of the auger chute are disengaged from the corresponding teeth defined along the lower edge of the one or more housing sections.

5. The broadcast spreader as recited in claim 1, in which the auger and the fan are coupled to a common shaft.

6. The broadcast spreader as recited in claim 5, in which the means for rotating the auger within the auger tube and the means for rotating the fan is a motor operably coupled to the common shaft.

7. The broadcast spreader as recited in claim 6, in which the motor is positioned in the hopper.

8. The broadcast spreader as recited in claim 5, wherein the hopper is supported on a frame with one or more wheels, wherein the means for rotating the auger within the auger tube and the means for rotating the fan is a transmission that couples an axle of the one or more wheels to the common shaft.

9. A broadcast spreader, comprising:
a hopper adapted to store granular material and including a discharge port through a bottom surface thereof;
a gate assembly, including
a hopper plate that is secured to the hopper, the hopper plate having a central opening that is in registry with the discharge port defined through the bottom surface of the hopper, and
a gate secured to the hopper plate and adapted for sliding movement relative to the hopper plate, the gate including one or more openings that can be placed in registry with the central opening defined by the hopper plate and the discharge port for allowing flow of the granular material through the discharge port, and then through the hopper plate and the gate;
an auger assembly positioned below the gate assembly, including an auger received in an auger tube, with the granular material passing from the hopper through the discharge port, and then through the hopper plate and the gate into the auger tube;
a means for rotating the auger within the auger tube;
a fan rotating about an axis for receiving and distributing the granular material passing from the hopper through the discharge port, through the gate, and through the auger assembly as the auger rotates within the auger tube; and
a means for rotating the fan;
an auger chute that is secured to the auger tube and adapted for rotational movement relative to the hopper, said auger chute directing the granular material onto the fan;
a gate linkage secured to the gate and facilitating sliding movement of the gate between an open position and a closed position;
a dial bracket; and
an adjustment dial secured to the dial bracket and adapted for rotational movement with respect to the dial bracket;
wherein the gate linkage includes a vertically extending projection for contacting and engaging a face of the adjustment dial; and
wherein a depth of the adjustment dial varies based on its rotational position, such that a user can rotate to the adjustment dial to a desired setting, and then advance the gate linkage forward until the vertically extending projection of the gate linkage contacts and engages the face of the adjustment dial to open the gate to a predetermined position to control the flow of the granular material to the fan.

10. The broadcast spreader as recited in claim 9, in which the auger and the fan are coupled to a common shaft.

11. The broadcast spreader as recited in claim 10, in which the means for rotating the auger within the auger tube and the means for rotating the fan is a motor operably coupled to the common shaft.

12. The broadcast spreader as recited in claim 11, in which the motor is positioned in the hopper.

\* \* \* \* \*